United States Patent Office 3,331,655
Patented July 18, 1967

3,331,655
SULFURIZED PHENOL TREATMENT OF BASIC DYED VINYLIDENE CYANIDE COPOLYMER FIBERS AND FIBER THEREFROM
Victor S. Salvin, Charlotte, N.C., assignor to Celanese Corporation, a corporation of Delaware
No Drawing. Filed June 22, 1964, Ser. No. 377,060
9 Claims. (Cl. 8—29)

This invention relates to the treatment of dyed fibrous materials in such a manner as to improve the dye fastness of such materials. More particularly, this invention relates to a method of rendering dye fast fibrous materials comprising a vinylidene cyanide copolymer dyed with a cationic dye, which method involves applying to such fibrous material a sulfurized phenol.

It is well known that synethetic resinous copolymers of vinylidene cyanide and one or more other monomers copolymerizable therewith exhibit valuable fiber-forming characteristics. However, the resulting vinylidene cyanide, copolymer fibers have been difficult to dye satisfactorily, particularly as regards the obtaining of dyed fibers exhibiting a requisite degree of dye fastness, e.g., fastness to washing, perspiration, and the like.

The resinous copolymers of vinylidene cyanide which are contemplated herein generally contain in excess of about 45% of vinylidene cyanide (methylene malononitrile or vinylidene dinitrile) units copolymerized with one or more ethylenically unsaturated monomers such as vinyl acetate or the like, as described in U.S. Patents 2,615,865 through 2,615,880 inclusive, 2,628,954, 2,650,911, 2,654,-724, 2,654,728, 2,657,197, 2,716,104, 2,716,105, 2,716,-106, and 2,740,769 and Canadian Patent No. 569,262.

The copolymers usually comprise units of vinylidene cyanide alternated with one or more copolymerizable monomers selected from the following classes of compounds:

(1) Vinyl esters of aliphatic monocarboxylic acids, preferably of the structure RCOOH; wherein R is an alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U.S. Patent 2,615,866, issued Oct. 28, 1952.

(2) Vinyl esters of the structure

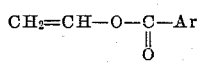

wherein Ar is an aromatic radical in which all the hydrogen atoms are attached to carbon atoms, such as vinyl benzoate; homologs of vinyl benzoate of the formula

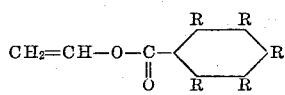

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in U.S. Patent 2,615,867, issued Oct. 28, 1952.

(3) Styrene and substituted styrenes of the general formula

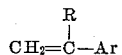

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and paramethoxystyrene, para-alpha-dimethyl styrene, paramethyl styrene, 3-4-dichlorostyrene, 3,4-difluorostyrene, 2-4-dichlorostyrene, 2,4,5-trichlorostyrene, dichloromonofluorostyrenes and the like. Copolymerization of vinylidene cyanide with styrene and substituted styrenes is disclosed in U.S. Patent 2,615,868, issued Oct. 28, 1952.

(4) Olefins of the general structure

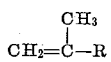

wherein R is an alkyl radical, preferably containing from 1 to 6 carbon atoms, such as isobutylene, 2-methyl propene-1, 2-methyl-butene-1, 2-methylpentene-1, 2,3-dimethylbutene-1, 2,3-dimethyl-pentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in U.S. Patent 2,615,865, issued Oct. 28, 1952.

(5) Alkyl esters of methacrylic acid which possess the structure

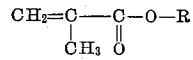

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,-871, issued Oct. 28, 1952.

(6) 2-halogenated monoolefins of the structure

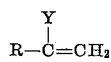

wherein R is a lower alkyl radical such as methyl, ethyl, propyl or butyl, and Y is a halogen atom, such as 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, and the like. Copolymerization of these compounds with vinylidene cyanide is disclosed in U.S. Patent 2,615,-877, issued Oct. 28, 1952.

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like; the copolymerization of all of which with vinylidene cyanide is described in U.S. Patent 2,615,875, issued Oct. 28, 1952.

(8) Vinyl esters of alpha-halo saturated aliphatic monocarboxylic acids of the structure

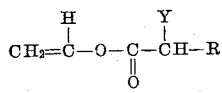

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-iodopropionate, vinyl alpha-bromovalerate and the like. The copolymerization of such monomers with vinylidene cyanide is described in U.S. Patent 2,615,876 issued Oct. 28, 1962.

(9) Vinyl halides such as vinyl chloride, vinyl bromide and the like, which are copolymerized with vinylidene cyanide as described in U.S. Patent 2,615,869, issued Oct. 29, 1952.

In addition to interpolymers of vinylidene cyanide containing the essentially 1 to 1 molar alternating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in U.S. Patent 2,716,106.

Other polymerizable monoolefinic compounds form interpolymers with vinylidene cyanide, in addition to those set out above including, by way of example, the following classes of compounds:

Monoolefinic hydrocarbons, such as 2,3-dimethylhexene-1; 2,3,4-trimethyl-pentene-1; ethylene; propylene; butylene; amylene; hexylene and the like.

Esters of unsaturated acids other than methacrylic, e.g., of acrylic acid and tiglic acid such as methyl acrylate, ethyl acrylate, propyl acrylate, isopropyl acrylate, amyl acrylate, 3,5,5-trimethylhexylacrylate, dodecylacrylate and ethyl tiglate.

Allyl and substituted allyl esters such as allyl chloride, allyl cyanide, allyl bromide, allyl fluoride, allyl iodide, allyl nitrate, allyl thiocyanate, allyl butyrate, allyl benzoate, allyl 3,5,5-trimethyl hexoate, allyl lactate, allyl pyruvate, allyl acetoacetate, allyl thioacetate, as well as methallyl esters corresponding to the above allyl esters as well as esters from such alkenyl alcohols as beta-ethyl allyl alcohol, beta-propyl allyl alcohol, and 1-butene-4-ol;

Esters of substituted acrylic acids, such as methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate;

Esters of monoethylenically unsaturated dicarboxylic acids, such as dimethyl maleate, diethyl maleate, dimethyl fumarate and diethyl fumarate;

Monoolefinically unsaturated organic nitriles such as acrylonitrile, methacrylonitrile, 1,1-dicyano propene-1, crotonitrile, oleonitrile and the like;

Monoolefinically unsaturated carboxylic acids such as acrylic acid, methacrylic acid, crotonic acid, butenoic acid, angelic acid, tiglic acid and the like;

Of these vinylidene cyanide copolymers a particularly useful copolymer which can readily be converted to filaments of excellent physical properties is the copolymer of vinylidene cyanide and vinyl acetate preferably consisting essentially of a regular structure of alternated units of the monomers, i.e., approximately 50 mol percent of each.

To improve the dyeability of the resultant fibers, the monomers making up the vinylidene cyanide copolymer are copolymerized along with sufficient amounts of an acid site-forming material such as an ethylenically unsaturated organic sulfonic acid to produce a copolymer containing about 0.15 to 2 mol percent of the sulfonic acid component.

Representative sulfonic acids which may be employed include styrene sulfonic acids such as ortho-, meta- or para- styrene sulfonic acid as well as commercial mixtures thereof, ortho-, meta- or para- sulfomethyl styrene, mixtures thereof, substitution products thereof such as polysulfo derivatives as well as β-sulfoethyl methacrylate (isethionic acid ester of methacrylic acid), sulfonic acids wherein the sulfo group is less than three atoms removed from the ethylenic unsaturation, e.g., vinylsulfonic acid, allylsulfonic acid, methallyl sulfonic acid and the like.

It is also frequently desirable to employ a mixture of more than one of the foregoing vinylidene cyanide polymers in order to form fibers, e.g. a mixture of a copolymer of vinylidene cyanide and vinylacetate and a terpolymer of vinylidene cyanide, vinyl acetate and an ethylenically unsaturated sulfonic acid or a salt thereof such as a styrene sulfonic acid or potassium styrene sulfonate. The fibers may also contain various additives which function as openers in addition to the vinylidene cyanide polymer or polymers, e.g., a polymer of N,N-dimethyl acrylamide, a copolymer of N,N-dimethyl acrylamide and vinyl acetate, and the like. These additives may be employed in amounts ranging from about 5 to about 10%, by weight, as based on the weight of the vinylidene cyanide copolymer.

Although fibrous materials made from the foregoing vinylidene cyanide copolymer resins have heretofore been dyed to full shades using various cationic dyes, the resulting dyed fibers have suffered from certain drawbacks. Specifically, the thus dyed fibers have exhibited an undesirably low degree of wet fastness. For instance, when vinylidene cyanide copolymer fibers dyed with a cationic dye are washed with an aqueous soap solution, considerable "bleeding" of the dye to the wash liquor occurs. The deficiency in wet fastness is also apparent when the dyed fibers are subjected to perspiration tests.

Accordingly, it is an object of the present invention to provide a method of treating vinylidene cyanide copolymer fibers which have been dyed with a cationic dye whereby the dye is fixed to the fibers and is rendered resistant to removal during subsequent washings.

Another object is to provide a method for improving the wet fastness of vinylidene cyanide copolymer fibers dyed with a cationic dye.

A further object is to provide vinylidene cyanide copolymer fibers dyed with a cationic dye wherein the dye has been fixed to the fibers.

Additional objects and the advantages of this invention will become apparent from the description that follows.

In accordance with one aspect of my invention, vinylidene cyanide copolymer fibers which have been dyed with a cationic dye are subjected to an after treatment with a sulfurized phenol. By virtue of such after treatment, the cationic dye becomes firmly "fixed" to the vinylidene cyanide copolymer fibers and the resulting fixed dyed fibers exhibit an unusually high degree of wet fastness.

A sulfurized phenol, having 1 sulfur atom for each phenol molecule, has been found to be particularly satisfactory in the method of the present invention and may be represented by the formula:

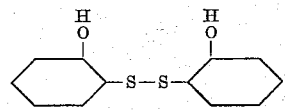

In addition to the aforedescribed disulfide, there are resins which are operable having more than 1 sulfur atom per phenol molecule, for example, a compound having the formula:

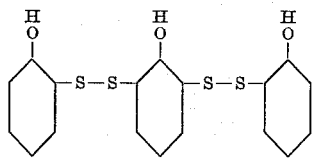

Further, complex mixtures containing a wide variety of disulfide compounds may also be employed in my invention. The sulfurized phenols which may be used to treat fibers in accordance with my procedure can also be solubilized by the introduction of —SO$_3$H groups, e.g., by treatment with sodium bisulfite or with formaldehyde bisulfite; and thereafter employed in the more soluble form. The bisulfite reacts to split the S—S linkage to give —S—SO$_3$Na. Thus, for example, an exemplary sulfurized phenol suitable for use in my process would have the formula:

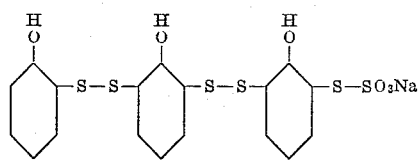

In addition to the use of the preceding sulfurized phenols, other sulfurized phenols may also be employed. The preparation of various sulfurized phenols has been described in a number of prior-art patents, e.g., U.S. Patents 1,911,709; 1,985,602; 1,989,989; British Patent 388,936; U.S. Patent 1,450,463; 1,600,525; 1,848,506; 1,757,400; 1,523,340; 1,553,014; 1,736,063; 1,690,640; 1,822,777; 1,882,778; 1,928,257; and 1,969,098.

Any number of methods have been used to prepare sulfurized phenols. These include: treating acid catalyzed phenol formaldehyde resin at elevated temperature with phenol and then sulfonating the product by treatment with a sulfonating agent such as concentrated sulfuric acid (Britist Patent 388,936); heating for an extended period a phenol with sulfur in the presence of an alkali (U.S. Patent 1,450,463); reacting with a sulfurized phenol (of the type described in U.S. Patent 1,454,463) a water soluble inorganic tin compound in aqueous solution to obtain a tin derivative thereof (U.S. Patent 1,911,709); reacting a monohydric phenol with an amount of sulfur that is insufficient to react with all of the phenol present in the presence of an alkali metal hydroxide and thereafter removing the unreacted phenol (U.S. Patent 1,985,602); reacting a phenol with sulfur chloride and heating the intermediate reaction product with a polyvalent metal salt such as tin chloride in the presence of sodium hydroxide (U.S. Patent 1,989,989); treating a highly sulfurized phenol (as prepared by U.S. Patent 1,450,463) with an alkali metal sulfite and an oxidizing agent such as oxygen, air, hydrogen peroxide or the like (U.S. Patent 1,600,525); heating at an elevated temperature a phenol, sulfur, and a small amount of sodium nitrite (U.S. Patent 1,848,506); heating a phenol, sulfur and a minor amount of a salt of a weak acid (U.S. Patent 1,523,340); treating a sulfurized phenol (obtained by the reaction of sulfur chloride with a phenol) and a hydroxybenzenesulfonic acid (U.S. Patent 1,553,014); treating a sulfurized phenol (obtained by the reaction of sulfur chloride and a phenol) with strong sulfuric acid and thereafter treating the resulting material with hydroxy benzene (U.S. Patent 1,736,063); treating a phenol with an amount of alkali sufficient to convert part but not all of the phenol into an alkali phenolate, heating the resulting mixture until free of water, thereafter adding sulfur and heating (U.S. Patent 1,690,640); fusing together a sulfurized phenol obtained by the reaction of sulfur and phenol with an alkali metal hydroxide (U.S. Patent 1,882,777); fusing a mixture of phenol and sulfur to form a sulfur-phenol condensate, removing the excess phenol therefrom, and fusing the resulting condensate with caustic (U.S. Patent 1,882,778); heating a phenol with a tin, antimony, or chromium compound in the presence of sulfur and sodium hydroxide (U.S. Patent 1,923,257); reacting sulfur monochloride with a phenol in the presence of stannic chloride, and thereafter adding caustic soda to obtain a sulfurized phenol condensate (U.S. Patent 1,969,098).

In accordance with one aspect of the invention, the dyed vinylidene cyanide copolymer fibers are treated with a sulfurized phenol, preferably by immersing the fibers in an aqueous bath containing the sulfurized phenol fixative. Alternatively, the sulfurized phenol could also be applied as a finish by padding in a water solution containing from 5 to 10 grams of phenol per liter of solution and then drying the fibers. It should be noted that the complex formed between the fixative and the cationic dye should desirably be of low water solubility at a pH of 10, even in the presence of detergent.

The concentration of the bath employed to treat the fibers may range from about .025 to about 0.1% by weight of the sulfurized phenol, with the preferred range being from about .04 to about .06%. Expressed in terms based upon the weight of fiber, from about 0.5 to about 3.0% by weight, of sulfurized phenol, as based on the fiber weight, may be employed. The weight ratio of bath liquor to fibrous material immersed therein may vary from about 20 to about 40 parts by weight of bath liquor per part of fibers, and preferably from about 20 to about 25 parts per part of fibers.

The quantity of sulfurized phenol which is optimum for best fixation varies with the amount of dye present on the fiber. For the heavier shades of dyes, 2.5% of phenol in the treatment bath which, at 80% exhaustion to the fiber, gives 2% of phenol on the fiber, is the optimum quantity. For lighter shades of basic dyes, the quantity of fixative may be altered, for example, thusly:

0.5% dye in fiber by weight=1.0% of fixative in bath (by weight).
1.0% dye in fiber by weight=1.5% of fixative in bath (by weight).
2.0% dye in fiber by weight=2.0% of fixative in bath (by weight).

In general, it is preferred that the amount of sulfurized phenol picked up by the fiber be from about 0.4 to about 2.0%, by weight, as based on the weight of the fiber.

The dyed vinylidene cyanide copolymer fibers generally are immersed in the bath for from about 10 to 40 minutes, and more preferably from about 20 to 30 minutes, while maintaining the temperature of the bath at from about 40° to about 70° C., and more preferably from about 40° to about 50° C. Thereafter, the fibrous material is withdrawn from the bath, without rinsing, and dried, usually at a temperature of from about 180 to 200° F., for from about 2 to 4 minutes.

By virtue of the after-treatment with a sulfurized phenol, there is virtually no reduction in the shade depth of the dyed fibrous materials, and the brightness of the shade is retained, even after repeated washings. Moreover, the method of my invention lends itself to the fixing of a wide range of cationic dyes to vinylidene cyanide copolymer fibers. A suitable dye is Sevron Blue 5G., C.I. 51,004.

The following example will further illustrate my invention. All parts are by weight unless otherwise indicated.

*Example*

A crimp set fabric made up of fibers, consisting of a blend of 90 weight percent terpolymer of 49.5 mole percent vinylidene cyanide, 49.5 mole percent vinyl acetate, and 1 mole percent styrene sulfonic acid, and 10 weight percent copolymer of 50 mole percent N,N- dimethyl acrylamide and 50 mole percent vinyl acetate, was dyed with cationic dyes. The fabric was dyed with 3 percent Sevron Blue 5G. The dyeing was carried out at 95° C. for two hours at a pH of 5.

The thus dyed fabric was passed into after-treatment baths maintained at 40° C. and containing 3 percent, by weight, based on the weight of fabric, of sulfurized phenol having the formula:

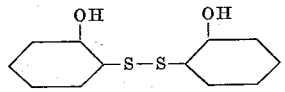

The weight ratio of fabric to treating bath liquor was maintained at 40 to 1. After the fabric was passed into the bath, the temperature of the bath was raised from 40° to 60–65° C. and maintained at the latter temperature for thirty minutes. The fabric was then extracted without rinsing and were dried at 200° F.

The after treatment did not result in any reduction in depth of shade or in brightness of shade.

Wash fastness tests were carried out at 140° C., for 45 minutes in a liter of water containing 5 g. of a soap, both on untreated fabric (which served as a "control") and on fabrics wherein the aforedescribed after-treatment was employed. Light fastness tests (20 hours) were also run.

Wet bleeding tests were also run wherein AATCC (American Association of Textile Chemists and Colorists) 63–1961 was followed. This testing procedure involves placing the fabric in contact with a multifiber stain cloth. The two fabrics are immersed in water for 15 minutes and are passed through squeeze rolls so as to retain from 200 to 250% of water. The moist fabrics are then placed between glass plates under constant pressure and are permitted to remain in contact for 18 hours at 100° F. The results of this testing procedure are expressed on a color transferenec scale where a value of 5 indicates negligible staining and a value of 1 shows severe staining.

The following table sets forth the results of the aforementioned tests.

|  | 3% Sevron Blue 0G | | |
|---|---|---|---|
|  | 140° F. Wash | | Wet bleeding stain on acetate |
|  | Shade | Color of wash liquor |  |
| Untreated "control" | 4 | 2 | 1–2 |
| Sulfurized phenol after-treatment | 4–5 | 4–5 | 5 |

The superior dye fastness of those dyed fabrics which were subjected to after-treatment with a sulfurized phenol, as compared to the "control" fabrics, is evident from the foregoing data.

Any departure from the above description which conforms to the present invention is intended to be included within the scope of the invention as defined by the following claims.

The embodiments of the invention in which an exclusive property or privilege is claimed are defined as follows:

1. A method of improving the dye-fastness of a fibrous material comprising a vinylidene cyanide copolymer dyed with a cationic dye wherein a sulfurized phenol is applied to said fibrous material.

2. A method of improving the dye-fastness of a fibrous material comprising a vinylidene cyanide copolymer dyed with a cationic dye wherein said fibrous material is immersed in a bath containing from about 0.5 to about 3.0%, by weight, of a sulfurized phenol, as based on the weight of said fibrous material, and the thus treated material is withdrawn from said bath and dried.

3. The method of claim 2 wherein said fibrous material is immersed in said bath for from about 10 to about 40 minutes while said bath is maintained at a temperature of from about 40° to about 70° C.

4. The method of claim 2 wherein the amount of said sulfurized phenol picked up by said fibrous material is from about 0.4 to about 2.0%, by weight, as based on the weight of said fibrous material.

5. The method of claim 1 wherein said copolymer is a terpolymer of from about 49 to about 49.5 mole percent vinylidene cyanide, about 49 to about 49.5 mole percent vinyl acetate, and from about 1 to about 2 mole percent styrene sulfonic acid.

6. The method of claim 5 wherein said fibrous material further comprises from about 5 to about 10% by weight, based on the weight of said vinylidene cyanide copolymer, of a copolymer of dimethyl acrylamide and vinyl acetate.

7. The method of claim 1 wherein said sulfurized phenol is a compound represented by the formula:

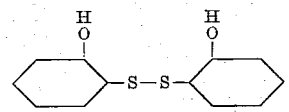

8. Fibrous material comprising a vinylidene cyanide copolymer dyed with a cationic dye and containing from about 0.4 to about 2.0%, by weight, of a sulfurized phenol, as based on the weight of said fibrous material.

9. The fibrous material of claim 8 wherein said sulfurized phenol is a compound represented by the formula:

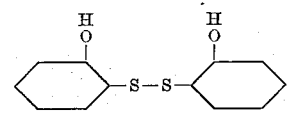

References Cited

UNITED STATES PATENTS 3,190,850   6/1965   Burke _____ 8—55

FOREIGN PATENTS 759,595   10/1956   Great Britain.

OTHER REFERENCES

American Dyestuff Reporter, Aug. 11, 1958, pp. 559–560.

Diserens: The Chemical Technology of Dyeing and Printing, vol. 2, pp. 94–99, pub. 1951 by Reinhold Publ. Corp., New York.

NORMAN G. TORCHIN, *Primary Examiner.*

DONALD LEVY, *Assistant Exmainer.*